(12) United States Patent
Phillips et al.

(10) Patent No.: US 7,678,009 B2
(45) Date of Patent: Mar. 16, 2010

(54) 8-SPEED TRANSMISSION

(75) Inventors: Andrew W. Phillips, Saline, MI (US);
Clinton E. Carey, Monroe, MI (US);
James M. Hart, Belleville, MI (US);
Scott H. Wittkopp, Ypsilanti, MI (US);
Madhusudan Raghavan, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 466 days.

(21) Appl. No.: 11/751,187

(22) Filed: May 21, 2007

(65) Prior Publication Data
US 2008/0293535 A1 Nov. 27, 2008

(51) Int. Cl.
*F16H 3/62* (2006.01)

(52) U.S. Cl. .................................... 475/275

(58) Field of Classification Search ............... None
See application file for complete search history.

(56) References Cited

U.S. PATENT DOCUMENTS

| | | | |
|---|---|---|---|
| 4,070,927 A | 1/1978 | Polak | |
| 4,709,594 A | 12/1987 | Maeda | |
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |
| 5,599,251 A | 2/1997 | Beim et al. | |
| 5,641,045 A | 6/1997 | Ogawa et al. | |
| 5,651,435 A | 7/1997 | Perosky et al. | |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 2009/0017964 A1* | 1/2009 | Phillips et al. | 475/275 |
| 2009/0017965 A1* | 1/2009 | Phillips et al. | 475/275 |
| 2009/0017966 A1* | 1/2009 | Phillips et al. | 475/275 |
| 2009/0017977 A1* | 1/2009 | Phillips et al. | 475/276 |
| 2009/0017979 A1* | 1/2009 | Phillips et al. | 475/282 |
| 2009/0017980 A1* | 1/2009 | Phillips et al. | 475/284 |

FOREIGN PATENT DOCUMENTS

JP 09-126283 5/1997

* cited by examiner

*Primary Examiner*—Dirk Wright
(74) *Attorney, Agent, or Firm*—Quinn Law Group, PLLC.

(57) ABSTRACT

The transmission has a plurality of members that can be utilized in powertrains to provide eight forward speed ratios and one reverse speed ratio. The transmission includes three planetary gear sets having six torque-transmitting mechanisms and two fixed interconnections. The powertrain includes an engine and torque converter that is continuously connected to one of the planetary gear members and an output member that is continuously connected with another one of the planetary gear members. The six torque-transmitting mechanisms provide interconnections between various gear members, the transmission housing and with the input member, and are operated in combinations of three to establish eight forward speed ratios and one reverse speed ratio.

5 Claims, 1 Drawing Sheet

| GEAR STATE | Gear Ratio | Ratio Step | 50 Gnd PC3 | 52 Gnd S2 | 54 S2 R2 | 55 PC1 R2 | 56 PC1 PC3 | 57 S1 PC3 |
|---|---|---|---|---|---|---|---|---|
| Rev | -3.296 | | x | x | | x | | |
| N | | -0.72 | o | | | | | |
| 1st | 4.579 | | x | | x | | x | |
| 2nd | 3.183 | 1.44 | x | x | | | x | |
| 3rd | 2.234 | 1.42 | | x | x | | x | |
| 4th | 1.735 | 1.29 | | x | | x | x | |
| 5th | 1.300 | 1.33 | | x | | | x | x |
| 6th | 1.000 | 1.30 | | | | x | x | x |
| 7th | 0.818 | 1.22 | | x | | x | | x |
| 8th | 0.655 | 1.25 | | x | x | | | x |

| | | | 50 | 52 | 54 | 55 | 56 | 57 |
|---|---|---|---|---|---|---|---|---|
| GEAR STATE | Gear Ratio | Ratio Step | Gnd PC3 | Gnd S2 | S2 R2 | PC1 R2 | PC1 PC3 | S1 PC3 |
| Rev | -3.296 | | X | X | | X | | |
| N | | -0.72 | O | | | | | |
| 1st | 4.579 | | X | | X | | X | |
| 2nd | 3.183 | 1.44 | X | X | | | X | |
| 3rd | 2.234 | 1.42 | | X | X | | X | |
| 4th | 1.735 | 1.29 | | X | | X | X | |
| 5th | 1.300 | 1.33 | | X | | | X | X |
| 6th | 1.000 | 1.30 | | | | X | X | X |
| 7th | 0.818 | 1.22 | | X | | X | | X |
| 8th | 0.655 | 1.25 | | | X | X | | X |

8-SPEED TRANSMISSION

TECHNICAL FIELD

The present invention relates to a power transmission having three planetary gear sets that are controlled by six torque-transmitting devices to provide eight forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven-, eight- and nine-speed transmissions provide further improvements in acceleration and fuel economy over six-speed transmissions. However, like the six-speed transmissions discussed above, the development of seven-, eight- and nine-speed transmissions has been precluded because of complexity, size and cost.

SUMMARY OF THE INVENTION

It is an object of the present invention to provide an improved transmission having three planetary gear sets controlled to provide eight forward speed ratios and one reverse speed ratio.

The transmission family of the present invention has three planetary gear sets, each of which includes a first, second and third member, which members may comprise a sun gear, a ring gear, or a planet carrier assembly member, in any order.

In referring to the first, second and third gear sets in this description and in the claims, these sets may be counted "first" to "third" in any order in the drawing (i.e., left to right, right to left, etc.). Additionally, the first, second or third members of each gear set may be counted "first" to "third" in any order in the drawing (i.e., top to bottom, bottom to top, etc.) for each gear set.

Each carrier member can be either a single-pinion carrier member (simple) or a double-pinion carrier member (compound). Embodiments with long pinions are also possible.

A first interconnecting member continuously connects the third member of the second planetary gear set with the first member of the third planetary gear set.

A second interconnecting member continuously connects the third member of the first planetary gear set with the second member of the second planetary gear set.

A first torque transmitting device, such a brake, selectively connects the second member of the third planetary gear set with a stationary member (transmission housing/casing).

A second torque transmitting device, such as a brake, selectively connects the first member of the second planetary gear set with a stationary member (transmission housing/casing).

A third torque transmitting device, such as a clutch, selectively connects the first member of the second planetary gear set with the third member of the second planetary gear set.

A fourth torque transmitting device, such as a clutch, selectively connects the third member of the second planetary gear set with the second member of the first planetary gear set.

A fifth torque transmitting device, such as a clutch, selectively connects the second member of the first planetary gear set with the second member of the third planetary gear set.

A sixth torque transmitting device, such as a clutch, selectively connects the first member of the first planetary gear set with the second member of the third planetary gear set.

The six torque-transmitting mechanisms are selectively engageable in combinations of three to yield eight forward speed ratios and one reverse speed ratio.

A variety of speed ratios and ratio spreads can be realized by suitably selecting the tooth ratios of the planetary gear sets.

The above features and other features and advantages of the present invention are readily apparent from the following detailed description of the best modes for carrying out the invention when taken in connection with the accompanying drawings.

BRIEF DESCRIPTION OF THE DRAWING

FIG. 1a is a schematic representation of a powertrain including a planetary transmission in accordance with the present invention; and FIG. 1b is a truth table and chart depicting some of the operating characteristics of the powertrain shown in FIG. 1a.

DESCRIPTION OF THE PREFERRED EMBODIMENT

Figures 1A, 1B:
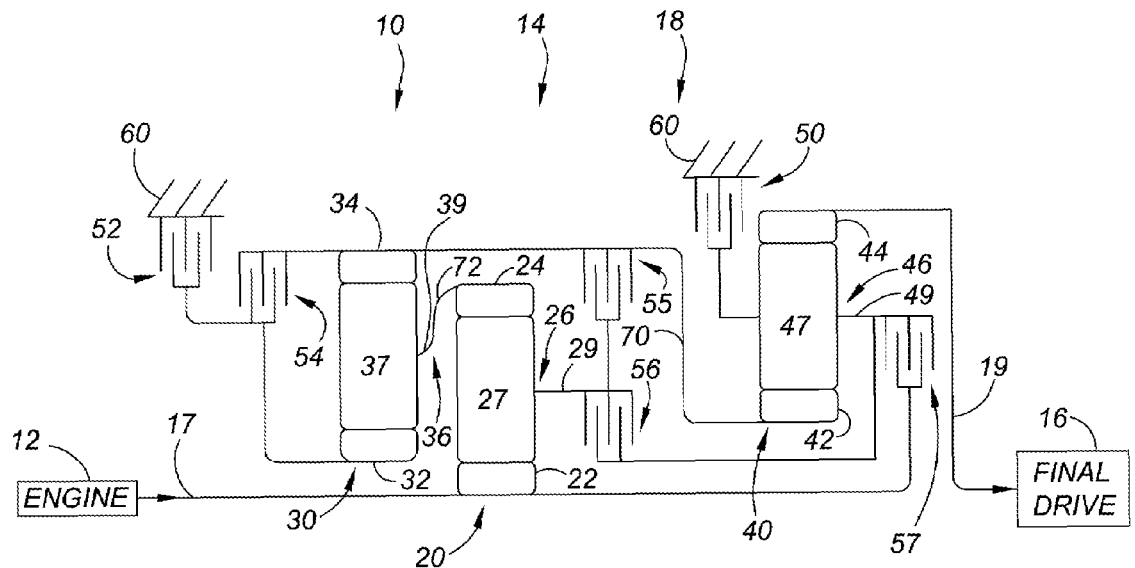

Referring to the drawings, there is shown in FIG. 1a a powertrain 10 having a conventional engine and torque converter 12, a planetary transmission 14, and a conventional final drive mechanism 16. The engine 12 may be powered using various types of fuel to improve the efficiency and fuel economy of a particular application. Such fuels may include, for example, gasoline; diesel; ethanol; dimethyl ether; etc.

The planetary transmission 14 includes an input member 17 continuously connected with the engine 12, a planetary gear arrangement 18, and an output member 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the ring gear member 34 and the sun gear member 32.

The planetary gear set 40 includes a sun gear member 42, a ring gear member 44, and a planet carrier assembly member 46. The planet carrier assembly member 46 includes a plurality of pinion gears 47 mounted on a carrier member 49 and disposed in meshing relationship with both the ring gear member 44 and the sun gear member 42.

The planetary gear arrangement also includes six torque-transmitting mechanisms 50, 52, 54, 55, 56 and 57. The torque-transmitting mechanisms 50 and 52 are a stationary-type torque-transmitting mechanism, commonly termed brakes or reaction clutches. The torque-transmitting mechanisms 54, 55, 56 and 57 are rotating-type torque-transmitting mechanisms, commonly termed clutches.

The input member 17 is continuously connected with the sun gear member 22 of the planetary gear set 20. The output member 19 is continuously connected with the ring gear member 44 of the planetary gear set 40. The first interconnecting member 70 continuously connects the ring gear member 34 of the planetary gear set 30 with the sun gear member 42 of the planetary gear set 40. The second interconnecting member 72 continuously connects the ring gear member 24 of the planetary gear set 20 with the carrier member 36 of the planetary gear set 30.

A first torque transmitting device, such as brake 50, selectively connects the planet carrier assembly member 46 of the planetary gear set 40 with the transmission housing 60. A second torque transmitting device, such as brake 52, selectively connects the sun gear member 32 of the planetary gear set 30 with the transmission housing 60. A third torque transmitting device, such as clutch 54, selectively connects the sun gear member 32 of the planetary gear set 30 with the ring gear member 34 of the planetary gear set 30 and the sun gear member 42 of the planetary gear set 40 via interconnecting member 70. A fourth torque transmitting device, such as clutch 55, selectively connects the planet carrier assembly member 26 of the planetary gear set 20 with the ring gear member 34 of the planetary gear set 30 and the sun gear member 42 of the planetary gear set 40 via interconnecting member 70. A fifth torque transmitting device, such as clutch 56, selectively connects the planet carrier assembly member 26 of the planetary gear set 20 with the planet carrier assembly member 46 of the planetary gear set 40. A sixth torque transmitting device, such as clutch 57, selectively connects the sun gear member 22 of the planetary gear set 20 with the planet carrier assembly member 46 of the planetary gear set 40.

As shown in FIG. 1b, and in particular the truth table disclosed therein, the torque-transmitting mechanisms are selectively engaged in combinations of three to provide eight forward speed ratios and one reverse speed ratio all with single transition shifts with a double overdrive.

The reverse speed ratio is established with the engagement of the brakes 50, 52 and clutch 55. The brake 50 engages the planet carrier assembly member 46 with the transmission housing 60. The brake 52 engages the sun gear member 32 with the transmission housing 60. The clutch 55 engages the planet carrier assembly member 26 with the ring gear member 34 and the sun gear member 42 via interconnecting member 70. The sun gear member 22 rotates at the same speed as the input member 17. The planet carrier assembly member 26, ring gear member 34 and sun gear member 42 rotate at the same speed. The ring gear member 24 and planet carrier assembly member 36 rotate at the same speed. The speed of the ring gear member 24 is determined from the speed of the sun gear member 22, the speed of the planet carrier assembly member 26 and the ring gear/sun gear tooth ratio of the planetary gear set 20. The sun gear member 32 does not rotate. The speed of the ring gear member 34 is determined from the speed of the planet carrier assembly member 36 and the ring gear/sun gear tooth ratio of the planetary gear set 30. The planet carrier assembly member 46 does not rotate. The ring gear member 44 and the output member 19 rotate at the same speed. The speed of the ring gear member 44, and therefore the output member 19, is determined from the speed of the sun gear member 42 and the ring gear/sun gear tooth ratio of the planetary gear set 40. The numerical value of the reverse speed ratio is determined utilizing the ring gear/sun gear tooth ratios of the planetary gear sets 20, 30 and 40.

The first forward speed ratio is established with the engagement of the brake 50 and the clutches 54, 56. The brake 50 engages the planet carrier assembly member 46 with the transmission housing 60. The clutch 54 engages the sun gear member 32 with the ring gear member 34 and the sun gear member 42 via interconnecting member 70. The clutch 56 engages the planet carrier assembly member 26 with the planet carrier assembly member 46. The sun gear member 22 rotates at the same speed as the input member 17. The planet carrier assembly member 26 and planet carrier assembly member 46 do not rotate. The ring gear member 24, planetary gear set 30 and sun gear member 42 rotate at the same speed. The speed of the ring gear member 24 is determined from the speed of the sun gear member 22 and the ring gear/sun gear tooth ratio of the planetary gear set 20. The ring gear member 44 and output member 19 rotate at the same speed. The speed of the ring gear member 44, and therefore the output member 19, is determined from the speed of the sun gear member 42 and the ring gear/sun gear tooth ratio of the planetary gear set 40. The numerical value of the first forward speed ratio is determined utilizing the ring gear/sun gear tooth ratios of the planetary gear sets 20 and 40.

The second forward speed ratio is established with the engagement of the brakes 50, 52 and clutch 56. The brake 50 engages the planet carrier assembly member 46 with the transmission housing 60. The brake 52 engages the sun gear member 32 with the transmission housing 60. The clutch 56 engages the planet carrier assembly member 26 with the planet carrier assembly member 46. The sun gear member 22 rotates at the same speed as the input member 17. The planet carrier assembly member 26 and planet carrier assembly member 46 do not rotate. The ring gear member 24 and planet carrier assembly member 36 rotate at the same speed. The speed of the ring gear member 24 is determined from the speed of the sun gear member 22 and the ring gear/sun gear tooth ratio of the planetary gear set 20. The sun gear member 32 does not rotate. The ring gear member 34 and sun gear member 42 rotate at the same speed. The speed of the ring gear member 34 is determined from the speed of the planet carrier assembly member 36 and the ring gear/sun gear tooth ratio of the planetary gear set 30. The ring gear member 44 and output member 19 rotate at the same speed. The speed of the ring gear member 44, and therefore the output member 19, is determined from the speed of the sun gear member 42 and the ring gear/sun gear tooth ratio of the planetary gear set 40. The numerical value of the second forward speed ratio is determined utilizing the ring gear/sun gear tooth ratios of the planetary gear sets 20, 30 and 40.

The third forward speed ratio is established with the engagement of the brake 52 and the clutches 54, 56. The brake 52 engages the sun gear member 32 with the transmission housing 60. The clutch 54 engages the sun gear member 32 with the ring gear member 34 and the sun gear member 42 via interconnecting member 70. The clutch 56 engages the planet carrier assembly member 26 with the planet carrier assembly member 46. The sun gear member 22 rotates at the same speed as the input member 17. The ring gear member 24, planetary gear set 30 and sun gear member 42 do not rotate. The planet carrier assembly member 26 and planet carrier assembly member 46 rotate at the same speed. The speed of the planet carrier assembly member 26 is determined from the speed of the sun gear member 22 and the ring gear/sun gear tooth ratio of the planetary gear set 20. The ring gear member 44 and output member 19 rotate at the same speed. The speed of the ring gear member 44, and therefore the output member 19, is determined from the speed of the planet carrier assembly member 46 and the ring gear/sun gear tooth ratio of the planetary gear set 40. The numerical value of the third forward speed ratio is determined utilizing the ring gear/sun gear tooth ratios of the planetary gear sets 20 and 40.

The fourth forward speed ratio is established with the engagement of the brake 52 and the clutches 55, 56. The brake 52 engages the sun gear member 32 with the transmission housing 60. The clutch 55 engages the planet carrier assembly member 26 with the ring gear member 34 and the sun gear member 42 via interconnecting member 70. The clutch 56 engages the planet carrier assembly member 26 with the planet carrier assembly member 46. The sun gear member 22 rotates at the same speed as the input member. The planet carrier assembly member 26, ring gear member 34, planetary gear set 40 and output member 19 rotate at the same speed. The ring gear member 24 and planet carrier assembly member 36 rotate at the same speed. The speed of the ring gear member 24 is determined from the speed of the sun gear member 22, the speed of the planet carrier assembly member 26 and the ring gear/sun gear tooth ratio of the planetary gear set 20. The sun gear member 32 does not rotate. The speed of the ring gear member 34, and therefore the output member 19, is determined from the speed of the planet carrier assembly member 36 and the ring gear/sun gear tooth ratio of the planetary gear set 30. The numerical value of the fourth forward speed ratio is determined utilizing the ring gear/sun gear tooth ratios of the planetary gear sets 20 and 30.

The fifth forward speed ratio is established with the engagement of the brake 52 and the clutches 56, 57. The brake 52 engages the sun gear member 32 with the transmission housing 60. The clutch 56 engages the planet carrier assembly member 26 with the planet carrier assembly member 46. The clutch 57 engages the sun gear member 22 with the planet carrier assembly member 46. The planetary gear set 20, planet carrier assembly member 36 and planet carrier assembly member 46 rotate at the same speed as the input member 17. The sun gear member 32 does not rotate. The ring gear member 34 rotates at the same speed as the sun gear member 42. The speed of the ring gear member 34 is determined from the speed of the planet carrier assembly member 36 and the ring gear/sun gear tooth ratio of the planetary gear set 30. The ring gear member 44 and output member 19 rotate at the same speed. The speed of the ring gear member 44, and therefore the output member 19, is determined from the speed of the sun gear member 42, the speed of the planet carrier assembly member 46 and the ring gear/sun gear tooth ratio of the planet carrier assembly member 40. The numerical value of the fifth forward speed ratio is determined utilizing the ring gear/sun gear tooth ratios of the planetary gear sets 30 and 40.

The sixth forward speed ratio is established with the engagement of the clutches 55, 56 and 57. In this configuration, the input member 17 is directly connected with the output member 19. The numerical value of the sixth forward speed ratio is 1.

The seventh forward speed ratio is established with the engagement of the brake 52 and the clutches 55, 57. The brake 52 engages the sun gear member 32 with the transmission housing 60. The clutch 55 engages the planet carrier assembly member 26 with the ring gear member 34 and the sun gear member 42 via interconnecting member 70. The clutch 57 engages the sun gear member 22 with the planet carrier assembly member 46. The sun gear member 22 and planet carrier assembly member 46 rotate at the same speed as the input member 17. The planet carrier assembly member 26, ring gear member 34 and sun gear member 42 rotate at the same speed. The ring gear member 24 and planet carrier assembly member 36 rotate at the same speed. The speed of the ring gear member 24 is determined from the speed of the sun gear member 22, the speed of the planet carrier assembly member 26 and the ring gear/sun gear tooth ratio of the planetary gear set 20. The sun gear member 32 does not rotate. The speed of the ring gear member 34 is determined from the speed of the planet carrier assembly member 36 and the ring gear/sun gear tooth ratio of the planetary gear set 30. The ring gear member 44 and the output member 19 rotate at the same speed. The speed of the ring gear member 44, and therefore the output member 19, is determined from the speed of the sun gear member 42, the speed of the planet carrier assembly member 46 and the ring gear/sun gear tooth ratio of the planetary gear set 40. The numerical value of the seventh forward speed ratio is determined utilizing the ring gear/sun gear tooth ratios of the planetary gear sets 20, 30 and 40.

The eighth forward speed ratio is established with the engagement of the brake 52 and the clutches 54 and 57. The brake 52 engages the sun gear member 32 with the transmission housing 60. The clutch 54 engages the sun gear member 32 with the ring gear member 34 and the sun gear member 42 via interconnecting member 70. The clutch 57 engages the sun gear member 22 with the planet carrier assembly member 46. The sun gear member 22 and planet carrier assembly member 46 rotate at the same speed as the input member 17. The ring gear member 24, planetary gear set 30 and sun gear member 42 do not rotate. The ring gear member 44 and output member 19 rotate at the same speed. The speed of the ring gear member 44, and therefore the output member 19, is determined from the speed of the speed of the planet carrier assembly member 46 and the ring gear/sun gear tooth ratio of the planetary gear set 40. The numerical value of the eighth forward speed ratio is determined utilizing the ring gear/sun gear tooth ratios of the planetary gear set 40.

As set forth above, the engagement schedule for the torque-transmitting mechanisms is shown in the truth table of FIG. 1b. This truth table also provides an example of speed ratios that are available in the above-described transmission. Also, the chart of FIG. 1b describes the ratio steps that are attained in the above described transmission. For example, the step ratio between the first and second forward speed ratios is 1.44, while the step ratio between the reverse speed ratio and first forward ratio is −0.72.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   first, second and third planetary gear sets each having first, second and third members;
   a first interconnecting member continuously connecting said third member of said second planetary gear set with said first member of said third planetary gear set;
   a second interconnecting member continuously connecting said third member of said first planetary gear set with said second member of said second planetary gear set;
   a first torque-transmitting mechanism selectively connecting said second member of said third planetary gear set with a stationary member;
   a second torque-transmitting mechanism selectively connecting said first member of said second planetary gear set with said stationary member;
   a third torque-transmitting mechanism selectively connecting said first member of said second planetary gear set with said third member of said second planetary gear set;
   a fourth torque-transmitting mechanism selectively connecting said second member of said first planetary gear set with said third member of said second planetary gear set;
   a fifth torque-transmitting mechanism selectively connecting said second member of said first planetary gear set with said second member of said third planetary gear set;
   a sixth torque-transmitting mechanism selectively connecting said first member of said first planetary gear set with said second member of said third planetary gear set;
   said torque-transmitting mechanisms being engaged in combinations of three to establish eight forward speed ratios and one reverse speed ratio between said input member and said output member.

2. The transmission defined in claim 1, wherein said first and second torque-transmitting mechanisms comprises brakes, and said third, fourth, fifth and sixth torque-transmitting mechanisms comprise clutches.

3. The transmission of claim 1, wherein said first, second and third members of said first, second and third planetary gear sets comprise a sun gear member, a planet carrier assembly member and a ring gear member, respectively.

4. The transmission of claim 1, wherein said input member is continuously interconnected with said first member of said first planetary gear set, and said output member is continuously interconnected with said third member of said third planetary gear set.

5. A multi-speed transmission comprising:
   an input member;
   an output member;
   first, second and third planetary gear sets each having a sun gear member, planet carrier assembly member and ring gear member;
   said input member being continuously interconnected with said sun gear member of said first planetary gear set;
   said output member being continuously interconnected with said ring gear member of said third planetary gear set;
   a first interconnecting member continuously connecting said ring gear member of said second planetary gear set with said sun gear member of said third planetary gear set;
   a second interconnecting member continuously connecting said ring gear member of said first planetary gear set with said planet carrier assembly member of said second planetary gear set;
   a first torque-transmitting mechanism selectively connecting said planet carrier assembly member of said third planetary gear set with a stationary member;
   a second torque-transmitting mechanism selectively connecting said sun gear member of said second planetary gear set with said stationary member;
   a third torque-transmitting mechanism selectively connecting said sun gear member of said second planetary gear set with said ring gear member of said second planetary gear set;
   a fourth torque-transmitting mechanism selectively connecting said planet carrier assembly member of said first planetary gear set with said ring gear member of said second planetary gear set;
   a fifth torque-transmitting mechanism selectively connecting said planet carrier assembly member of said first planetary gear set with said planet carrier assembly member of said third planetary gear set; and
   a sixth torque-transmitting mechanism selectively connecting said sun gear member of said first planetary gear set with said planet carrier assembly member of said third planetary gear set;
   said torque-transmitting mechanisms being engaged in combinations of three to establish eight forward speed ratios and one reverse speed ratio between said input member and said output member.

* * * * *